April 3, 1934.    A. F. HANSEN    1,953,649
CULTIVATOR ATTACHMENT
Filed July 3, 1933
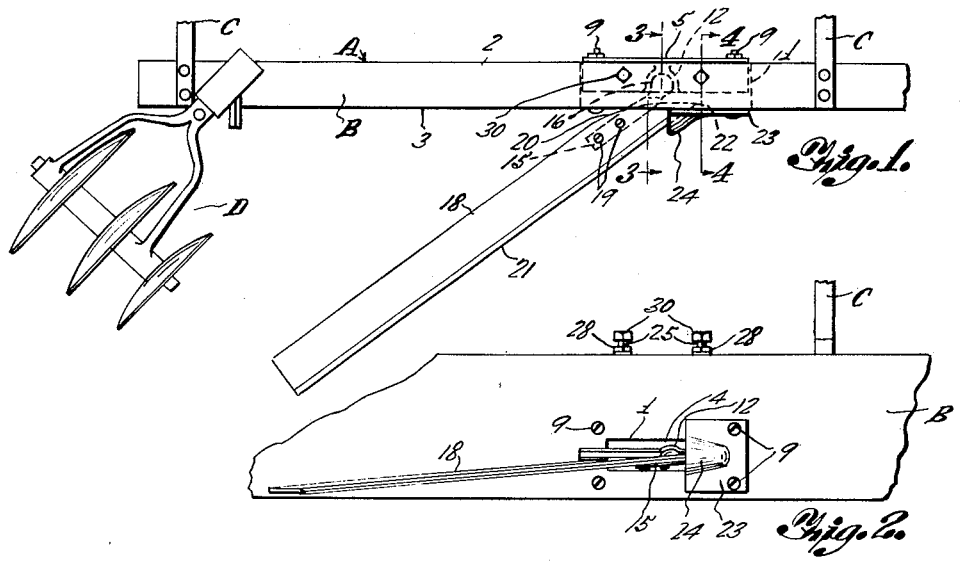
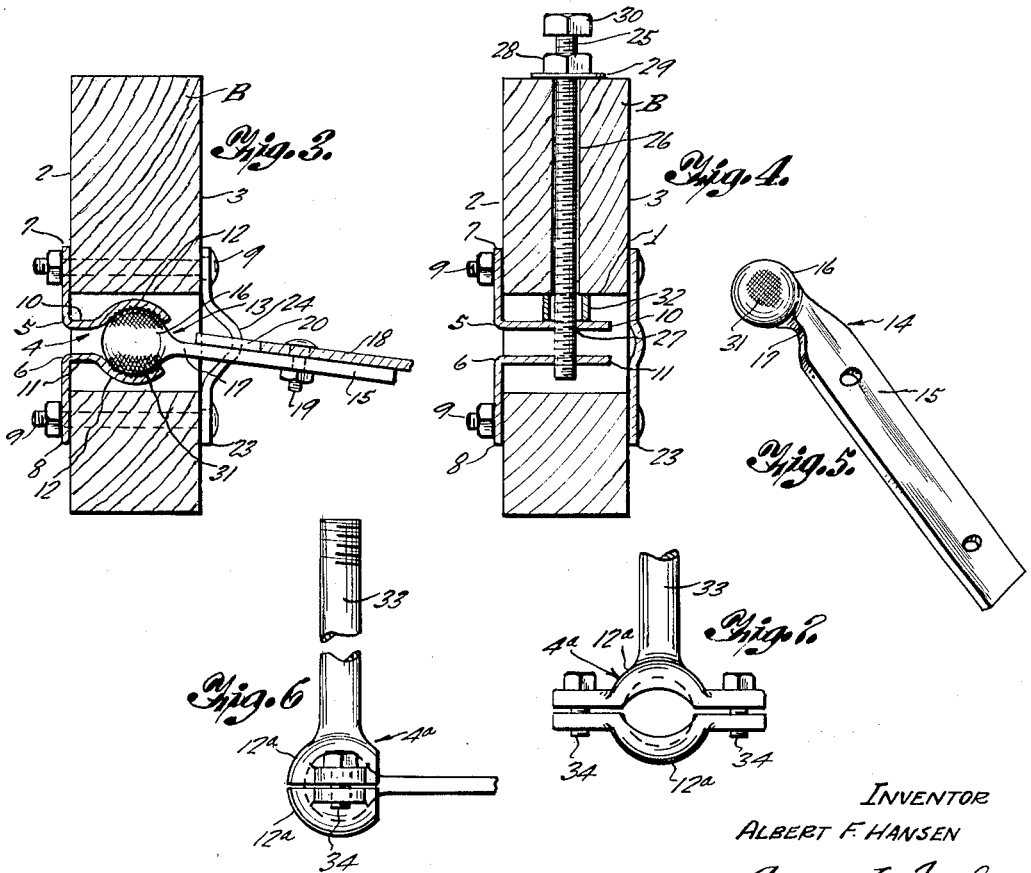
INVENTOR
ALBERT F. HANSEN
By Adam E. Fisher
ATTORNEY Patented Apr. 3, 1934

1,953,649

UNITED STATES PATENT OFFICE 1,953,649

CULTIVATOR ATTACHMENT

Albert F. Hansen, McLean, Tex.

Application July 3, 1933, Serial No. 678,842

2 Claims. (Cl. 97—179)

This invention relates to cultivator attachments and the main object is to provide a simple and efficient form of weed knife to be attached to a cultivator or other implement for cutting weeds between the adjacent rows of plants.

Another object is to provide a weed knife which is so mounted on the supporting and carrying implement as to be readily adjustable in both horizontal and vertical planes whereby to vary the swath or path cut as well as the depth of the cut.

A further object is to provide a device of this kind including a substantially spherical two part socket adapted for mounting on the cultivator or implement to receive a ball or head at one end of the weed cutting knife and allow adjustment of the knife in all planes relative to the path of travel of the implement, there being clamping means associated with the socket to clamp the two parts thereof together on the knife head and hold the same in its adjusted position.

With these and other objects in view the invention resides in the novel construction and arrangement of parts as hereinafter set forth and claimed, reference being had to the accompanying drawing wherein:

Figure 1 is a plan view of the right hand side portion of a cultivator of the type known as a sled cultivator, the invention being shown applied thereto.

Figure 2 is a fragmental side view of the cultivator and weed knife.

Figure 3 is an enlarged vertical section along the line 3—3 in Figure 1.

Figure 4 is an enlarged vertical section along the line 4—4 in Figure 1.

Figure 5 is an enlarged perspective view of the ball head or connection and its tang for mounting the blade.

Figure 6 is an end view of a modified form of adjustable connection, only a part of the blade mounting tang being shown.

Figure 7 is a side view of the socket portion alone of the connection shown in Figure 6.

Referring now with more particularity to the drawing the reference character A designates generally a cultivator of the sled type which in accordance with the conventional construction comprises a pair of sled-like runners, one of which is shown at B, joined and supported in spaced parallel relationship by cross bars C and each carrying a cultivator gang, one of which is shown at D, together with conventional lever assemblies (not shown) for adjusting the positions of the cultivator gangs and runners.

In accordance with the present invention each runner B has an elongated longitudinally extended slot 1 at a point adjacent or a short distance forwardly of its center, the said slot opening at the inner and outer sides 2 and 3 of the runners as shown in Figures 2 and 3. A ball socket assembly designated generally at 4 is mounted in each slot 1 and comprises two angle plates 5 and 6 having their webs 7 and 8 secured to and against the inner sides of the runner by bolts 9 passed through the runner and webs, and arranged one adjacent each end of each web. The position of the angle plates 5 and 6 is such that the webs 10 and 11 extending in an outward direction in the slot 1 are spaced and normally stand apart a short distance in a vertical direction for a purpose to be apparent. At medial points the webs 10 and 11 of the angle plates 5 and 6 are pressed out to form cups or cup-shaped complementary depressions 12 which together form a ball socket open at its outwardly disposed side 13.

A connecting element 14 is provided comprising a tang 15 upset and formed at one end into a ball head 16 connecting with the tang by a relatively narrow neck 17. This head 16 is adapted for mounting in the depressions 12 of the angle plates 5 and 6 with the tang 15 directed outwardly through the slot 1 and projected laterally from the runner B as shown, in which position the ball and socket connection allows said tang to be swung forwardly or rearwardly in a horizontal plane as well as swung upwardly or downwardly in a vertical plane as will be readily apparent. A weed knife or blade 18 of elongated flat form is secured at its inner end by bolts 19 to the tang 15 whereby said connecting element 14 supports and adjustably carries the blade. At its inner end 20 the blade 18 is beveled off toward its front edge to clear the angle plates 5 and 6 in all positions and the said front edge is sharpened as designated at 21. The sharpened point 22 of the blade thus formed is guarded by a guard plate 23 mounted on the outer face of the runner B forwardly of the blade by the same bolts 9 holding the angle plates 5 and 6 in place at this end and this guard plate is pressed outwardly at its rear central portion in the form of a hood 24 extending over the point of the blade for some distance and clearing the same sufficiently to permit the free movement or adjustment desired.

From the foregoing it will be apparent that by the ball and socket or universal joint connection the knife or blade 18 may be adjusted to cut a swath of any width and depth as the cultivator moves over the ground or field. This variation in the width of the swath cut is of particular advantage in cutting weeds between adjacent rows of plants and to accommodate different distances between the rows. Of course, there would be two knives or blades employed, one on each runner B as hereinbefore described. The reduced neck 17 and opening between the webs 10 and 11 permit a large degree of movement as will be understood.

In order to secure the blade in any adjusted position two clamping bolts 25 are provided and extended freely downward through openings 26 in the runners and through aligned openings 27 in the uppermost web 10 and are threaded in and through the lower web 11. These bolts 25 are located just forwardly and rearwardly of the depressions or socket 15 as shown in Figure 1 and each bolt has a tension or draw nut 28 and washer 29 bearing against the upper face of the runner in such manner that by turning down these draw nuts, meanwhile holding the head 30 of the bolts, the lower web 11 may be drawn upwardly compressing the webs on the ball head 16 and holding the same rigidly in position. To facilitate this action the head 16 as well as the inner faces of the cups 12 may be knurled or otherwise roughened as at 31 to provide a rigid frictional grip between the parts. In order to hold the upper web 10 in position against the upward force of the lower web in this action small sleeves 32 are placed over the bolts 25 between this web and the upper face of the slot 1.

For mounting on implements of other kinds such as the usual wheel borne shovel cultivator (not shown) the socket assembly used may take the form of that shown at 4a in Figures 6 and 7 in which one cup-shaped member 12a is formed integrally with an elongated threaded rod or stub 33 and the other member 12a is secured in place by stud screws 34. The blade mounting connecting element 14 may be placed in this assembly as shown and may swing freely in both vertical and horizontal planes and be secured in an adjusted position by turning up the screws 34 to force the members 12a together. The complete assembly may be attached to the cultivator or other implement in any suitable way by the threaded rod or stub 33.

While I have herein set forth certain preferred embodiments of my invention it is understood that I may vary from the same in minor structural details so as best to construct a practical device for the purposes intended, not departing from the spirit of the invention and within the scope of the appended claims.

I claim:

1. In a device of the kind described, in combination with a cultivator runner having a slot, angle plates mounted on the runner with their webs extended into the slot and spaced apart, the said webs having complementary cup shaped ball socket depressions, a connecting element comprising a ball head pivotally mounted in and between the ball socket depressions and a tang extended out angularly and laterally from the runner through the slot therein, and a weed knife secured at one end to the said tang.

2. In a device of the kind described, in combination with an implement runner having a slot, a pair of angle plates secured adjacent the slot and including spaced webs disposed in the slot, the said webs having complementary cupped depressions intermediate their ends, a ball head connecting element mounted by its head in the said depressions, clamping screws threaded through one web and passed loosely through the other out through the runner adjacent the slot, draw nuts on the clamping screws bearing against the runner whereby the said webs may be drawn together to tighten the depressed portions on the ball head, and a knife secured to the said connecting element.

ALBERT F. HANSEN.